United States Patent
Culman et al.

(10) Patent No.: US 7,139,401 B2
(45) Date of Patent: Nov. 21, 2006

(54) HARD DISK DRIVE WITH SELF-CONTAINED ACTIVE ACOUSTIC NOISE REDUCTION

(75) Inventors: Todd G. Culman, San Jose, CA (US); Roger F. Hoyt, San Jose, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 684 days.

(21) Appl. No.: 10/037,871

(22) Filed: Jan. 3, 2002

(65) Prior Publication Data
US 2003/0123675 A1 Jul. 3, 2003

(51) Int. Cl.
*H03B 29/00* (2006.01)

(52) U.S. Cl. .................... 381/71.7; 381/71.3

(58) Field of Classification Search ............ 381/71.1, 381/71.9, 71.7, 71.3; 310/344
See application file for complete search history.

(56) References Cited

U.S. PATENT DOCUMENTS

| | | | |
|---|---|---|---|
| 5,046,874 A | | 9/1991 | St. Clair |
| 5,129,003 A | | 7/1992 | Saruta |
| 5,499,301 A | | 3/1996 | Sudo et al. |
| 5,828,768 A | * | 10/1998 | Eatwell et al. ............ 381/333 |
| 5,886,489 A | | 3/1999 | Rowan et al. |
| 5,995,632 A | | 11/1999 | Okada |
| 6,157,116 A | * | 12/2000 | Sampietro et al. ......... 310/334 |
| 2001/0046300 A1 | * | 11/2001 | McLean .................... 381/71.4 |

OTHER PUBLICATIONS

TDB Jan. 1989 p. 256-258.

* cited by examiner

*Primary Examiner*—Brian T. Pendleton

(57) ABSTRACT

An active noise reduction system for reducing the acoustic noise generated by a hard disk drive or generated external of a hard disk drive. The active noise reduction system is integrated into the hard disk drive and produces an acoustic waveform that is 180 degrees out-of-phase with the acoustic noise being generated, for example, by the spindle motor and VCM. The acoustic noise is received directly through a microphone or indirectly through the read/write head, spindle motor driver, or VCM driver. The acoustic noise is processed by electronics and the noise canceling waveform is either retrieved from the hard disk drive's memory, disk, or generated by the electronics. The noise canceling waveform is then broadcasted through one or more transducers that are integrated in the hard disk drive.

17 Claims, 5 Drawing Sheets

HARD DISK DRIVE WITH SELF-CONTAINED ACTIVE ACOUSTIC NOISE REDUCTION

BACKGROUND OF THE INVENTION

1. Field of the Invention

This invention relates in general to acoustic noise reduction in a media storage system and more particularly, to active noise reduction for a hard disk drive.

2. Description of Related Art

As personal computers have proliferated in the work place and home, concerns have increased about their effect on the work and home environment. One area of concern is the effect of acoustic noise generated while the computer is in operation. A personal computer contains many different components, some of which generate acoustic noise. Examples of noise generating components include fans, hard disk drives (HDDs), and power supplies. HDDs in particular, operate at relatively high rotation speeds and are a large contributor to noise. HDDs are not only used in personal computers but are also used in personal television products (PTV), which are devices for recording broadcasted information, similarly to a video cassette recorder (VCR). Since a PTV is commonly located close to a TV, acoustic noise generated by the HDD becomes an important factor.

Typically, acoustic noise generated by the HDD can be attributable to two main sources, the spindle motor with it rotating disks, and the actuator with its voice coil motor (VCM). Contemporary HDDs are being designed with higher spindle speeds and faster access times for improving the performance of the HDD, however this improvement has resulted in increased acoustic noise.

Attempts to reduce acoustic noise generally follow one of two approaches. The first approach uses a sound absorbing material to surround, for example, the drive module to insulate the external environment from the noise generated by the HDD. One main disadvantage with this approach is that the sound absorbing material will generally provide heat insulation as well. As heat builds up in the HDD, the performance of the HDD can degrade. Another approach for decreasing acoustic noise is to increase the seek time of the HDD by reducing the movement of the actuator, which has the negative effect of decreasing the performance.

Active noise reduction is the second approach taken to reduce the acoustic noise. Typically, a microphone remotely located from the HDD receives undesirable acoustic noise and intended sound, then feeds it to an electronic circuit where it is phase-shifted 180 degrees, amplified, and broadcasted through one or more transducers, such as a speaker. Shifting the waveform of the receiving acoustic noise creates an "out-of-phase" signal that, when played back at the same time as the noise being generated, reduces and or cancels it out. U.S. Pat. No. 5,828,768 describes a multi-media computer having piezoelectric transducer panels, microphones and a sound card, configured to provide active noise reduction. The microphones are positioned in the internal walls of a desktop computer or to the inside of the display panel of a lap top computer and provide acoustic noise feedback to an electronic circuit that generates a noise cancellation sound that is broadcasted through the speaker to cancel fan, HDD, and floppy disk drive noise. The problem with this approach is that when acoustic noise is mixed with intended sound, the sound can get cancelled or reduced along with the acoustic noise because the electronic circuit may not be able to distinguish between the two. For example, under this approach when a HDD is used in a PTV, the intended TV sound would be cancelled along with the undesirable noise.

What is needed is an acoustic noise reduction method that can selectively reduce noise generated by the HDD while not affecting intended sound, or changing the form factor of the HDD.

SUMMARY OF THE INVENTION

The present invention overcomes the drawbacks of the prior art by providing active acoustic noise reduction that is integrated into the HDDs. An acoustic waveform is generated that is 180 degrees out-of-phase with the acoustic noise being generated by the HDD or generated externally of the HDD.

In general, two components in the HDD are responsible for producing most of the intrinsic acoustic noise of the HDD, an actuator that typically includes a VCM and a spindle motor that is typically a DC brushless motor. The active noise reduction schemes are directed to reducing the intrinsic acoustic noise generated by primarily these two components, although other acoustic noise arising from other sources within and external to the HDD may also be effectively removed using similar schemes without departing from the scope and spirit of the present invention.

In one embodiment, a microphone is used for receiving acoustic noise from the spindle motor or VCM. The noise signal is processed by electronics, where it is phase-shifted, amplified, and broadcasted through a transducer. In an alternative approach, different repeatable acoustic noise waveforms produced by the spindle motor or VCM under different operating conditions are stored on either the HDD's disk or in memory. The electronics retrieves from either the HDD's disk or memory, a waveform (180 degrees out of phase) corresponding to the noise generated by the spindle motor or VCM. In a second embodiment, the microphone is removed and sound cancellation is based on certain assumptions, one of which is that the VCM and spindle motor each produce characteristic acoustic noise. A waveform generator is used to create a repeatable waveform (180 degrees out of phase) matching the noise waveform being generated. Alternatively, the noise canceling waveform can be stored and retrieved from the HDD's disk or memory. In another approach, the drive signal from the spindle motor or VCM is wave shaped or filtered to produce a noise canceling waveform. The last approach applies wave shaping or filtering to the servo readback signal from the read/write head to produce a noise canceling waveform.

In another aspect of the present invention, the self-contained, integral noise reduction feature of the drive may be used to reduce and actively damp external vibrations induced by external acoustic noise, in addition to reducing the self-generated acoustic noise from the drive itself. This is particularly useful for systems in which multiple drives may be mounted together (e.g., in a rack), where acoustic noise in the environment could induce various orders of vibrations in the multi-drive support structure, affecting the performance or reliability of the disk drives.

DETAILED DESCRIPTION OF THE PREFERRED EMBODIMENT

This invention is described in a preferred embodiment in the following description with references to the following figures. While this invention is described in terms of the best mode of achieving this invention's objectives, it will be appreciated by those skilled in the art that variation may be accomplished in view of these teachings without deviating from the spirit or scope of the invention.

Figure 12:
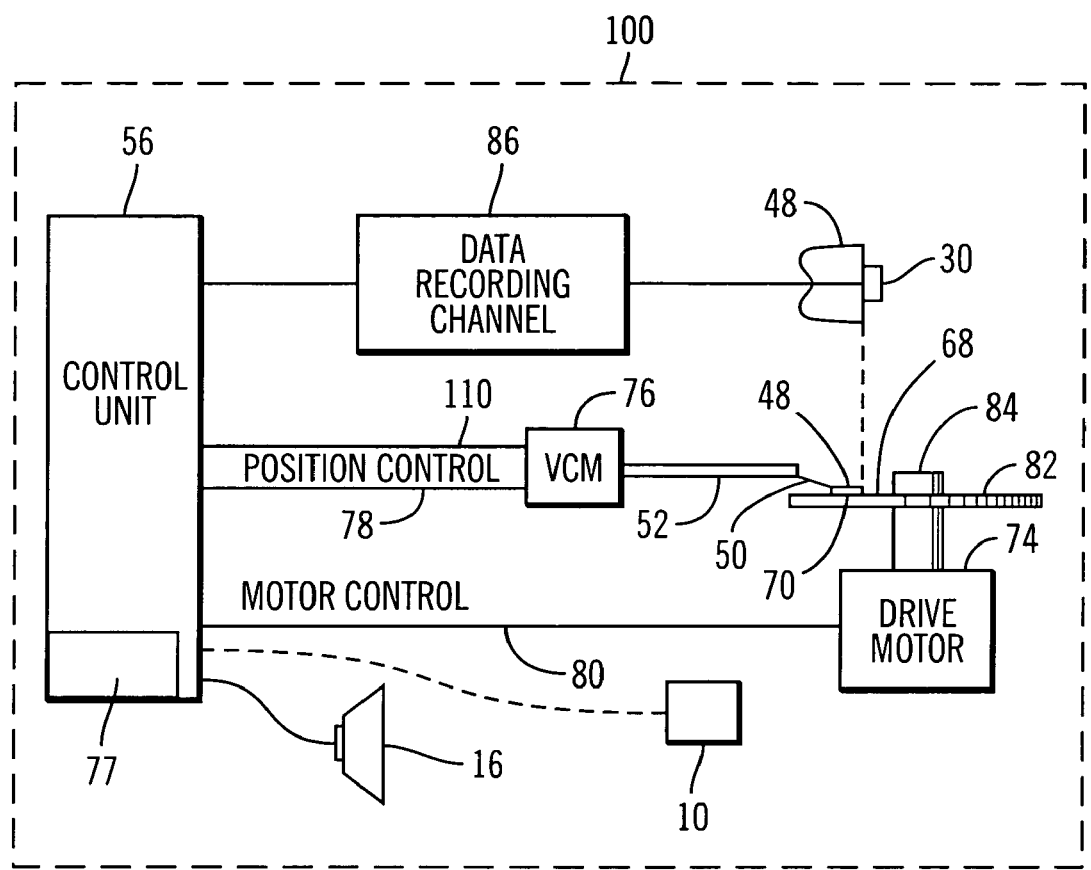
FIG. 12 is a simplified schematic/block diagram of a magnetic disk storage system that incorporates the present invention.

The present invention is described in reference to a magnetic disk drive. It is to be understood that the present invention is not limited to implementations in such devices. FIG. 12 illustrates a simplified schematic block diagram of a magnetic disk storage system embodying the active noise reduction concept of the present invention. The magnetic disk storage system comprises at least one rotatable magnetic disk 82 which is supported on a spindle 84 and rotated by a disk drive motor 74, and at least one slider 48 positioned in close proximity to the magnetic disk 82 at the disk surface 68. Data is stored on each disk 82 in the form of an annular pattern of concentric data tracks (not shown). Each slider 48 contains one or more integrated MR read heads/inductive write transducers 30 which are attached to an actuator arm 52 by means of an ILS assembly 50. Each actuator arm 52 is attached to an actuator 76 that can be a voice coil motor (VCM) 76. As the disk 82 rotates, the slider 48 is controlled to move across the disk surface 68 by the actuator 76 so that the slider 48 may access different portions of the disk surface 68 where desired data is recorded or read. The slider 48 flies in close proximity over the rotating disk surface 68, riding on an air bearing 70 formed between the magnetic MR read heads/inductive write transducers 30 and the rotating disk surface 68. The various components of the magnetic disk storage system are controlled in operation by control signals generated by the control unit 56, such as drive motor signals of line 80, head position, seek control signals on line 78, and position signals on line 110. Read and write signals are communicated to and from MR read head/inductive write transducer 30 by means of a recording channel 86. Electronics 77 processes signal information received from different sources as described in the two embodiments of the present invention and sends a noise reducing signal to transducer 16. An optional microphone 10 interfaces with the electronics 77 and is used for receiving acoustic noise generated by the disk drive motor 74 and or VCM 76. All of the components of the magnetic disk storage system are enclosed in housing 100.

In each of the embodiments of the present invention, different self-contained active noise reduction systems are used to reduce the acoustic noise generated by the spindle motor with its rotating disks and VCM. All of the components for each of the different noise reduction system, such as the transducers and processing electronics are integrated into the HDD and have no affect on the overall size of the HDD.

Each embodiment of the present invention requires at least one transducer for broadcasting the noise cancellation waveform (180 degrees out-of-phase). The transducer selected is typically based on size, frequency response, and efficiency. Additionally, the transducer can be attached to the bottom or top of the HDD and for performance reasons, as close as possible to the spindle motor and or VCM.

Figure 1:
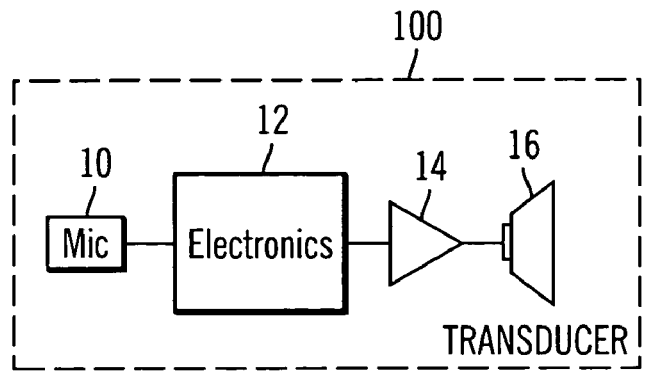
FIG. 1 is a simplified blocked diagram of the first embodiment of the present invention showing a feedback noise reduction system consisting of a microphone, processing electronic, amplifier, and transducer.

The active noise reduction scheme for the first embodiment uses a microphone for receiving acoustic noise from the spindle motor and VCM. The noise is processed by electronics, where it is phase-shifted, amplified, and broadcasted through a transducer. FIG. 1 illustrates a simplified block diagram of an active noise reduction system of the present invention. The system contains at least one microphone 10 incorporated within the HDD enclosure 100 and which is preferably located close to the spindle motor and VCM. The microphone is responsible for receiving the acoustic noise generated by the spindle motor and VCM. It is electrically connected to a processing electronics 12. The processing electronics 12 analyzes the acoustic noise received by the microphone 10 and produces a phase-shifted waveform that is sent to an amplifier 14, where the amplitude of the waveform is adjusted and broadcasted to one or more transducers 16 integrated within the enclosure of the HDD 100 as described earlier.

The microphone 10 selected can be of a number of different types such as those having transducing elements of crystal or ceramic chips, ribbons, moving coils, and capacitors. Preferably, the microphone 10 is placed as close as possible to the spindle motor and or VCM to provide it with the best directional path for receiving acoustic noise and at the same time limiting it from receiving intended sound. In addition the gain of the microphone 10 can also be adjusted to reduce its overall sensitivity. The microphone 10 can either be integrated in to the HDD's electronics board or it can be separately mounted in the HDD enclosure 100.

The processing electronics 12 typically includes at least some of the following: preamplification, phase reversal, amplifier, signal equalization, signal delay, feedback control, feedforward control, etc. The electronics 12 may be implemented in the form of printed circuit and/or chip (e.g. ASIC), or as part of the HDD control unit 56. Any number of specific algorithms and techniques could be employed in the required signal processing, all of which are well known to those skilled in the art. The processing electronics 12 receives acoustic noise from the microphone 10 and filters out frequencies above 20 KHz, which is generally the highest frequency audible to human ears. As a result, the filtered waveform is the dominant component of the acoustic noise. The waveform is phase-shifted and sent to an amplifier 14, where the amplitude of the waveform is adjusted to match the amplitude of the incoming acoustic noise waveform. The waveform is then broadcasted through a transducer 16.

Figure 2:
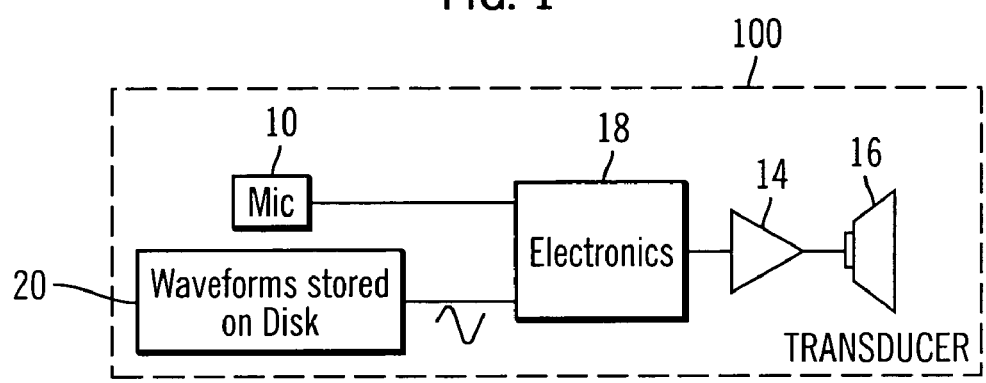
FIG. 2 is a simplified blocked diagram of an alternative approach to the first embodiment of the present invention showing a noise reduction system consisting of a microphone, processing electronic, HDD with stored waveforms, amplifier, and transducer.

In an alternative approach, waveforms unique to each spindle motor and or VCM are pre-stored in the HDD and are used for canceling noise generated by the spindle motor and or VCM. Additionally, a microphone is used to receive acoustic noise not cancelled by the pre-stored waveforms. FIG. 2 illustrates a simplified block diagram of a noise reduction system based on this approach.

During different phases of operation the spindle motor and VCM generate repeatable acoustic noise, herein referred to as cyclical noise. One or more waveforms matching the cyclical noise generated by the spindle motor or VCM are stored on the disk 20 of the HDD. The processing electronics 18 determines the correct waveform to retrieve from the disk 20 based on commands issued to the drive.

A microphone 10 receives the acoustic noise generated by the spindle motor and VCM, most of which is non-cyclical noise after cancellation of a large percentage of the cyclical noise the playback of the stored waveform. Any cyclical noise received by the microphone 10 can be filtered using an analog or digital circuitry. The cyclical noise is processed by the processing electronics 18 where it is phase-shifted and broadcasted through a transducer 16. This noise reduction system is an improvement over the system described in the first embodiment because it provides more efficient use of the signal from the microphone, by eliminating the cyclical acoustic noise component.

The processing electronics 18 can contain similar circuitry as described in the first embodiment, in addition to electronic circuitry capable of retrieving the appropriate noise waveforms stored on the disk and filtering and phase shifting signals from the microphone 10. For example, the processing electronics 18 can interface with the HDD's electronics board, which includes a number of integrated modules, some of which are capable of retrieving information stored on the disk 20. In particular is the read/write channel and associated analog circuitry which function primarily to facilitate the reading of data from and writing of data to the information data sectors of the disk 20.

Variations of the cyclical noise waveforms that are characteristic of the spindle and VCM at more than one operating condition (e.g. rpm) may be provided. The waveforms are stored in special areas on the disk 20 that are not accessible for user data. The recording of the different noise waveforms can be done during the manufacturing process of the HDD, using the same techniques that are used to store servo codes and or other various parameters of the HDD. For example, the cyclical noise waveform can be created by recording/digitizing actual spindle motor and VCM acoustic noise after final assembly of each HDD. This recording can then be transferred to the disk 20 using techniques known to those skilled in the art.

Figure 3:
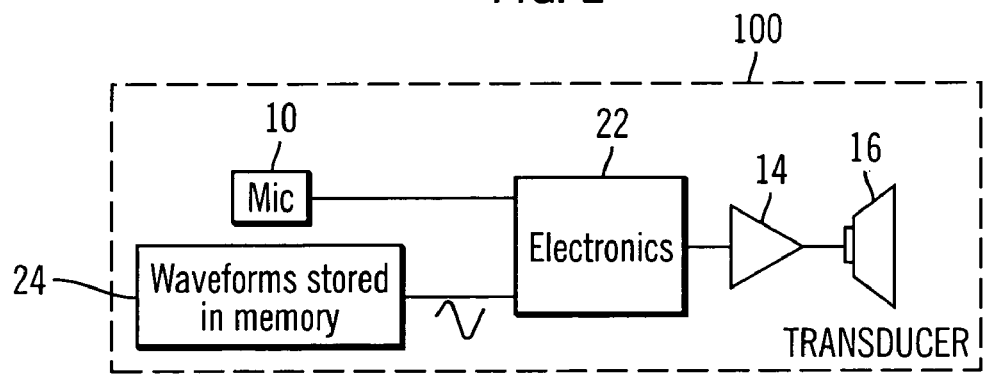
FIG. 3 is a simplified blocked diagram of an alternative approach to the first embodiment of the present invention showing a noise reduction system consisting of a microphone, processing electronics, memory with stored waveforms, amplifier, and transducer.
Figure 11:
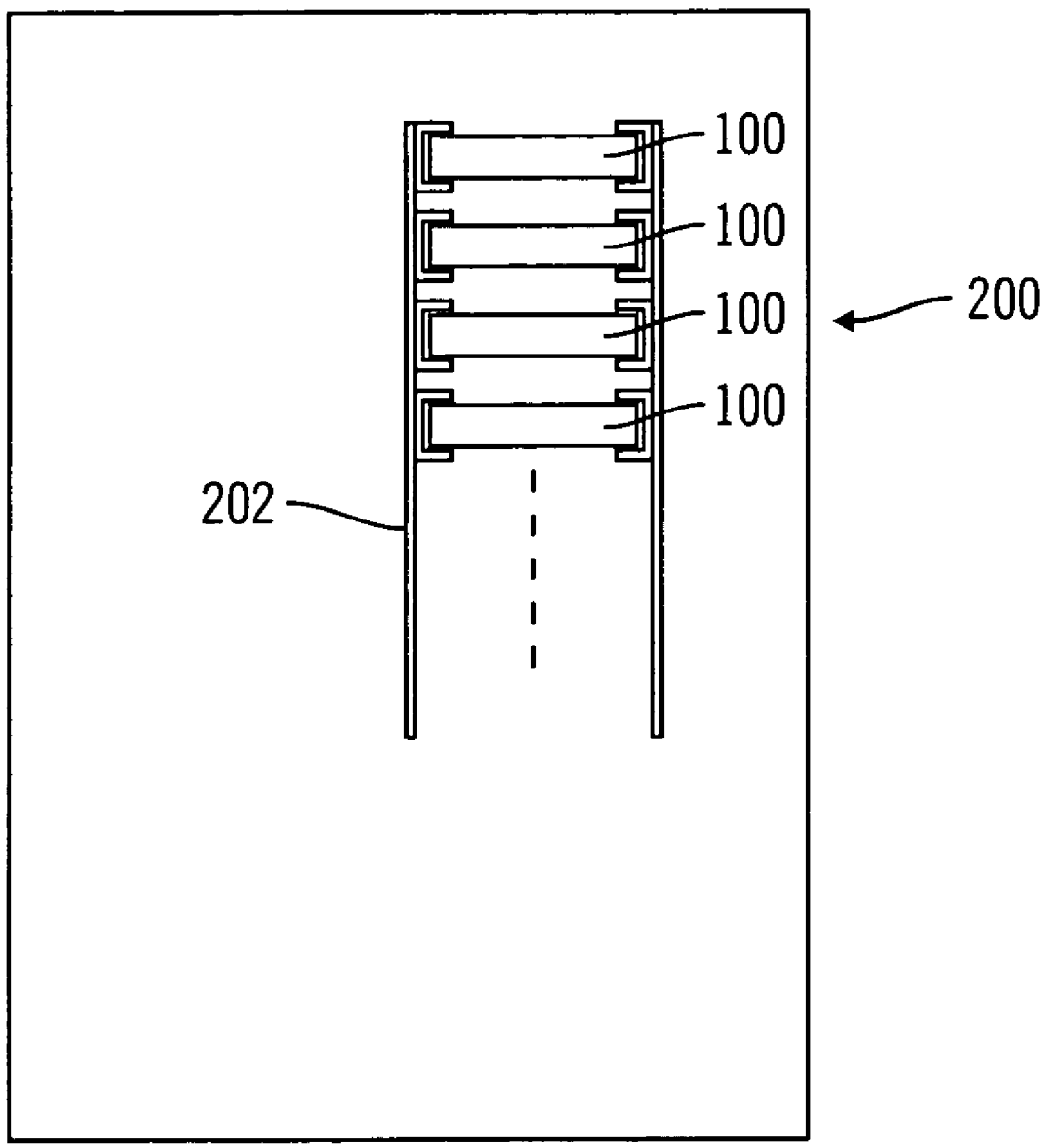
FIG. 11 is a simplified schematic diagram of a data storage system that comprises multiple HDD support in a rack.

FIG. 3 illustrates an alternative to using the HDD's disk to store noise waveforms as described for FIG. 2. In this approach, the noise waveforms are stored in memory 24 (e.g. HDD's electronics board's random access memory (RAM), read only memory (ROM), erasable programmable read only memory (EPROM), PROM, etc.). The electronics board as mentioned previously, includes a number of integrated circuit modules. In particular, the electromechanical functionality of the HDD's spindle motor and VCM for positioning the read/write heads with respect to the rotating disk is accomplished by means of a module which typically includes a data processor of some type, such as a digital signal processor (DSP), associated microprocessor with related circuitry, for example in the form of an application specific integrated circuit (ASIC), and power drivers. An EPROM containing microinstructions is typically associated with the DSP and microprocessor. The functionality of the read/write channel and the DSP/microprocessor module is controlled by the controller module 56, for example as shown in FIG. 11, which also provides the HDD device interface, buffer management, disk formatting, and error correction code (ECC) functionality.

The processing electronics 22 can contain similar circuitry as described in the first embodiment, in additional to electronic circuitry capable of retrieving noise waveforms stored in memory 24, either directly or indirectly through one or more modules in the HDD's electronics board. Similarly to the description for FIG. 2 a microphone 10 receives mostly non-cyclical acoustic noise and forwards the noise to the processing electronics 22. The non-cyclical noise is phase-shifted, sent to an amplifier 12 where the amplitude is adjusted, then broadcasted through a transducer 16.

In the second embodiment, acoustic noise is determined through either signals from the read/write head, spindle motor, VCM, or on an assumption that the spindle motor and VCM produce certain characteristic acoustic noise patterns.

Figure 4:
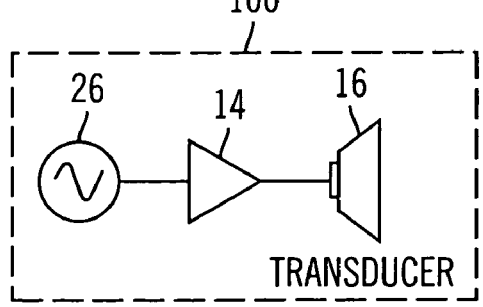
FIG. 4 is a simplified blocked diagram of an alternative approach to the first embodiment of the present invention showing a noise reduction system consisting of a constant tone generator, amplifier, and transducer.

FIG. 4 illustrates a simplified blocked diagram of a noise reduction system in which a constant phase-shifted waveform 26 similar to the acoustic noise waveform being produced by a spindle motor is broadcasted through a transducer 16. The constant phase-shifted waveform can be generated by various means including an oscillator, dedicated waveform synthesizer, or digital sample techniques. If, for example, an oscillator is used, the output of the oscillator can be filtered, or harmonics added to match the acoustic noise being produced by the spindle. The resulting waveform is then amplified 14 and broadcasted through a transducer 16.

An assumption is made that the acoustic noise generated from each particular model of motor and VCM will have a similar cyclical acoustic noise waveform. Therefore, a "standard" waveform is generated and broadcasted through a transducer 16. During assembly, calibration is performed on the HDD, for example with adjustments made to the amplitude of the noise canceling waveform. The waveform generator can be interfaced with one of the modules of the HDD's electronics board such that the waveform generator will be deactivated when the HDD powers down. In operation, the generated waveform is phase-shifted, amplified by amplifier 14, and broadcasted through the transducer 16. Alternatively, the phase-shifted waveform can be stored on the disk of the HDD similarly to what had been described for FIG. 2 or the waveform can be stored in memory 24, as described for FIG. 3. In each of the two approaches, only one unique noise waveform is stored on the disk or in memory 24.

The active noise reduction scheme for the following approach uses a modulated square wave for the spindle motor and a signal output from the VCM, as waveform signal generators. Alternatively, both signals can be used as a strobe for synchronizing a waveform generator within the HDD's electronics board.

Figure 5:
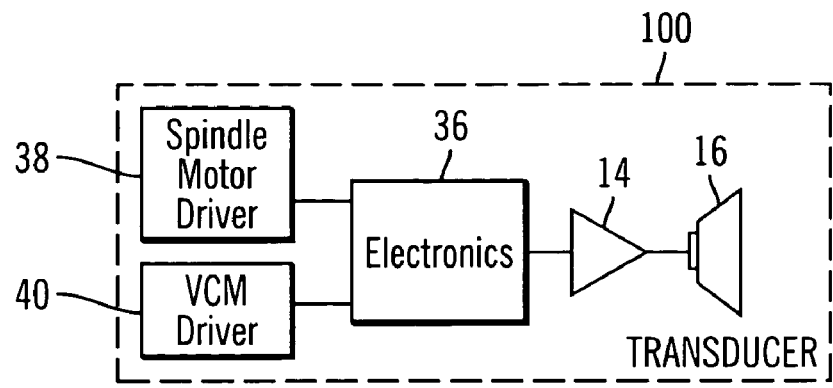
FIG. 5 is a simplified blocked diagram of the second embodiment of the present invention showing a noise reduction system consisting of processing electronics, signal for the spindle motor and VCM, amplifier, and transducer.

FIG. 5 illustrates a simple block diagram of a noise reduction system containing processing electronics 36 that receives an output signal from both the VCM 40 and spindle motor 38 and either filters or wave shapes the output to match the corresponding acoustic noise waveform being produced by the spindle motor or VCM. The spindle motor is powered by a modulated square wave that is generated by the HDD's electronics board. The spindle motor is typically a polyphase, brushless DC motor which conventionally includes a stationary circuit element having a plurality of stator coil structures formed about a central axis thereof, and a movable rotor assembly having plurality of permanent magnets mounted for rotation about a central axis, above the stator coils. The coils are periodically energized with the modulated square waves in order to induce rotational movement in a rotor assembly. It is this modulated square wave that can be filtered or wave shaped by the processing electronics 36 to correspond to the noise waveform produced by the spindle motor. The waveform is then amplified 14, phase-shifted and broadcasted through a transducer 16.

The VCM produces a signal output that has an AC component that is derived from the servo offset signal, which can be used for a noise reducing waveform. Reading and recording data in a desired track requires knowledge of the track over which the read/write head is positioned and requires precise centering of the read/write head over the track as the disk rotates. Conventionally, the read/write head is mounted on an actuator arm that is moved by a servo. A disk drive servo control system controls the movement of the arm radially across the disk to move the read/write head from track to track in a seek operation and, once over a selected track, to maintain the head in a path centered over the track in a track-following operation. The head remains centered over the desired track by reading servo track information from the disk surface. The servo track information comprises a pattern of high-frequency magnetic flux transitions, generally flux reversals, that are pre-recorded in the tracks at the time of disk manufacture. The servo track information provides offset information that is processed by the servo control unit and sent to the VCM to correct for misalignment between the read/write head and the track. The VCM provides an output signal 40 that is derived from the servo offset signal. The output signal can be filtered or wave shaped by the processing electronics 36 to correspond to the noise waveform produced by the VCM. The waveform is then amplified 14, phase-shifted and broadcasted through a transducer 16.

The modulated square wave and the servo offset signal can also be used as time pulse or strobe to synchronize with a signal produced by a waveform generator that can be the processing electronics 36.

Figure 6:
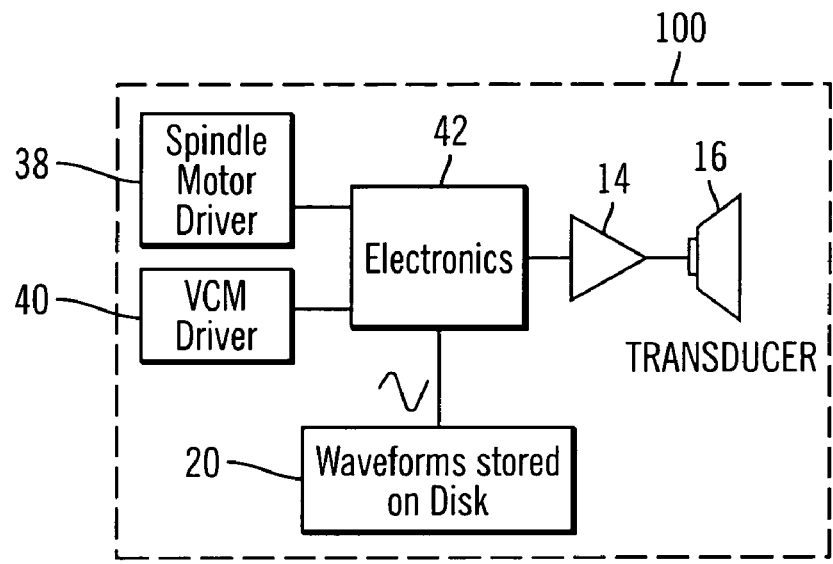
FIG. 6 is a simplified blocked diagram of an alternative approach to the second embodiment of the present invention showing a noise reduction system consisting of processing electronics, signals for the spindle motor and VCM, HDD with stored waveforms, amplifier, and transducer.

In an alternative approach to what has just been described for FIG. 5, FIG. 6 illustrates a noise reduction system that includes waveforms that are pre-stored on the HDD's disk for noise cancellation. The system contains processing electronics 42 that receives the drive electronics output to the spindle motor 38 and VCM 48 as described for FIG. 5 and based on the output, the processing electronics 42 selects the corresponding noise canceling waveform, phase-shifts it, amplifies it and broadcasts it through a transducer 16.

Figure 7:
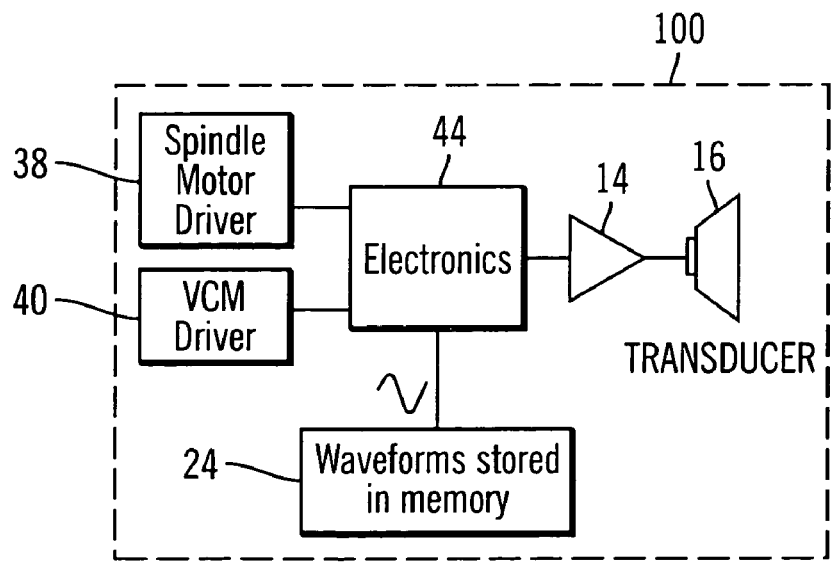
FIG. 7 is a simplified blocked diagram of an alternative approach to the second embodiment of the present invention showing a noise reduction system consisting of processing electronics, signals for the spindle motor and or VCM, memory with stored waveforms, amplifier, and transducer.

Instead of having the waveforms pre-stored on the HDD's disk, it can be stored in memory as described for FIG. 3. FIG. 7 illustrates a noise reduction system that includes waveforms that are pre-stored in the HDD's memory 34 for noise cancellation. The system contains similar components to those described for FIG. 5, with the addition of waveforms stored in memory 24. The output from the spindle motor and VCM are received by the processing electronics 42 described in FIG. 3. Based on the output from the spindle motor and VCM the processing electronics 44 retrieves the appropriate waveform from memory 24, where it is phase-shifted, amplified, and broadcasted through a transducer 16.

Figure 8:
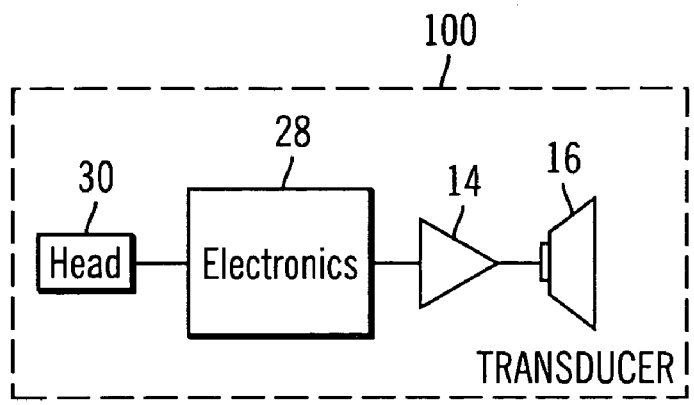
FIG. 8 is a simplified blocked diagram of an alternative approach to the second embodiment of the present invention showing a noise reduction system consisting of a processing electronics, read/write head, amplifier, and transducer.

Alternatively, the active noise reduction scheme for the following approach uses the readback signal from the read/write head for the waveform signal generator. FIG. 8 illustrates a simple block diagram of a noise reduction system containing processing electronics 28, read/write head 30, amplifier 14, and a transducer 16. As previously described for FIG. 5, in addition to the read/write head 30 reading data signal, it also reads servo signals at audio frequencies. The data signal is at a high frequency of greater than 10 MHz and the servo readback signal is at a low audio frequency. The readback signal from the read/write head 30 is derived from the servo signal and spacing variations of the read/write head to the HDD's disk. The Wallace's spacing loss factor postulates that the loss of magnetic signal power will be proportional to the media and head separation expressed as: $-2\pi d/\lambda$, where d=head-disk spacing, $\lambda$=written wavelength of the disk. Therefore, fly height variations and track variations will modulate the readback signal. Furthermore, these variations can be closely correlated to the noise vibrations from the disk and head suspension. Therefore, by knowing this correlation, the readback signal can be applied to filter or wave shaped a noise reducing waveform to match the acoustic noise being generating. The waveform is phase-shifted, amplified by amplifier 14, and broadcasted through a transducer 16.

In addition, when the read/write head 30 is rapidly accessing information from the disk, the read/write head 30 moves quickly from one track to the next on the disk, usually within a few milliseconds per track. The readback signal from the read/write head 30 varies dramatically as the read/write head 30 passes over each track. One of the modules in the HDD's electronics board is responsible for counting each track crossing and providing information to the electronics board, enabling the electronics board to know what track the read/write head 30 is on. The readback signal generated by the track crossing can be filtered and or wave shaped to match the corresponding noise waveform. The waveform is then phase-shifted, amplified and broadcasted through a transducer 16.

Figure 9:
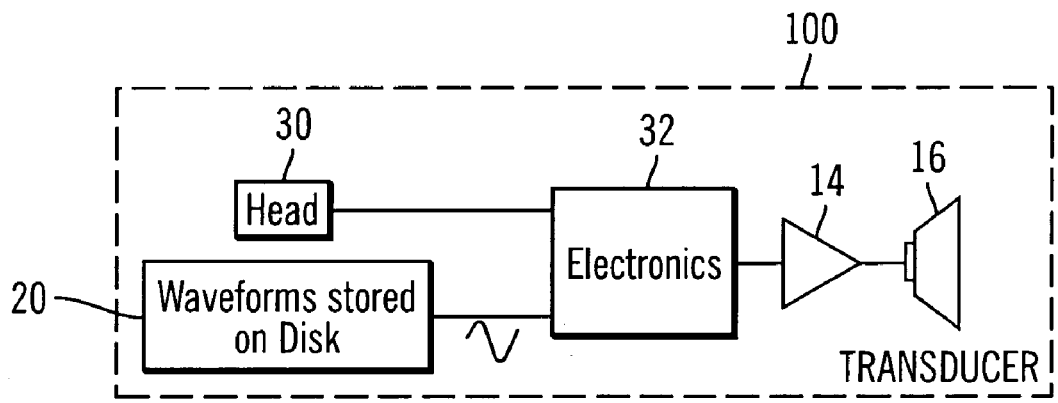
FIG. 9 is a simplified block diagram of an alternative approach to the second embodiment of the present invention showing a noise reduction system consisting of a processing electronic, read/write head, HDD with stored waveforms, amplifier, and transducer.

In an alternative approach to what has been described for FIG. 8, FIG. 9 illustrates a noise reduction system that includes waveforms that are pre-stored in the HDD's disk 20 for noise cancellation. The system contains a processing electronics 32 that perform various functions, one of which is to determine the correct waveform to retrieve from the disk based on commands issued to the drive. During operation, the processing electronics 32 receives readback signals from the read/write head 30 and based on this signal, determines the appropriate noise canceling waveform. The waveform is retrieved from the disk 20, phase-shifted, amplified 14 and broadcasted through a transducer 16.

Instead of having the waveform pre-stored on the HDD's disk, it can be stored in the memory 24 as described for FIG.

Figure 10:
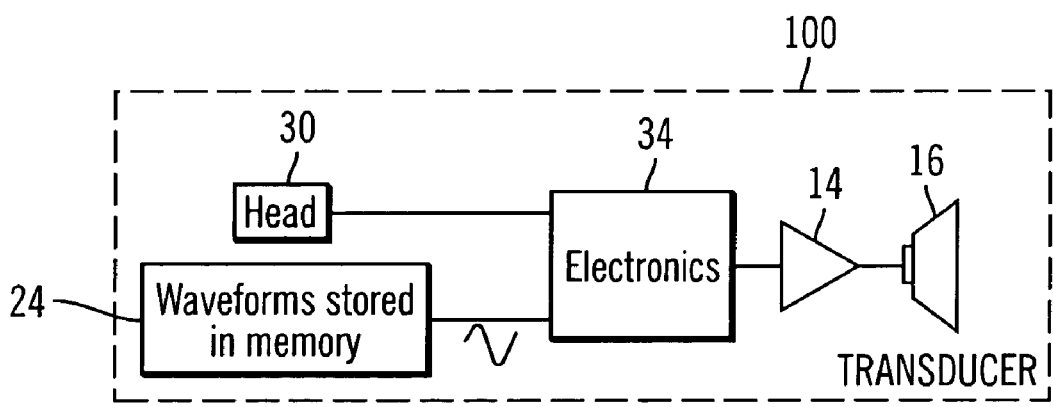
FIG. 10 is a simplified block diagram of an alternative approach to the second embodiment of the present invention showing a noise reduction system consisting of a processing electronics, read/write head, memory with stored waveforms, amplifier, and transducer.

3. FIG. 10 illustrates a noise reduction system that includes waveforms that are pre-stored in the HDD's memory 24 for noise cancellation. The system contains similar components to those described for FIG. 8, with the addition of waveforms stored in memory 24. The readback signal is processed using similar techniques described for FIG. 8 and the retrieval of corresponding waveforms are similar to the techniques described for FIG. 3.

In summary, the present invention provides a method of reducing the acoustic noise generated by a HDD and more specifically the noise generated by two components, the spindle motor and the VCM. Each of the noise reduction approaches described in the two embodiments generate a waveform that is phase-shifted, amplified and broadcasted through a transducer. All of the noise reduction components are an integral part of the HDD and do not effect the form factor of the HDD. Although the invention has been described with reference to a HDD, the invention is also applicable to other storage devices such as CD-ROM, DVD-ROM, tape drives, etc.

In another aspect of the present invention, the self-contained, integral noise reduction feature of the HDD may be used to reduce and actively damp external vibrations induced by external acoustic noise, in addition to reducing the self-generated acoustic noise from the drive itself. This is particularly useful for systems in which multiple drives may be mounted together, where acoustic noise in the environment could induce various orders of vibrations in the multi-drive support structure, affecting the performance or reliability of the drives. FIG. 11 shows a data storage system 200, having a plurality of HDD 100 supported by a support structure such as a rack 202. The noise canceling waveform is generated by a transducer 16, based on stored waveforms, and/or by processing the actual acoustic noise from the environment as received by the microphone 10 in the HDD 100, in similar fashions as disclosed in the embodiments illustrated above. In this embodiment, the noise canceling waveform is of sufficient magnitude to counteract against the external acoustic noise present at or around the HDD, especially at the support structure 202 to reduce the effect of acoustically induced vibrations at the HDD. It is understood that the reduction of external acoustic noise may be in addition and in parallel to the reduction of the acoustic noise generated within the HDD.

While the present invention has been described with respect to the preferred embodiment in accordance therewith, it will be apparent to those in the skilled art that various modifications and improvements may be made without departing from the scope and spirit of the invention. Accordingly, the disclosed invention is to be considered merely as illustrative and limited in scope only as specified in the appended claims.

The invention claimed is:

1. A data storage device comprising:
   a housing;
   a storage medium;
   a motor drive for moving the storage medium within the housing;
   a transducer for accessing the storage medium wherein said transducer produces a waveform within said housing;
   an actuator for positioning the transducer with respect to the storage medium; and
   noise reduction means comprising a waveform generating means for generating a noise reducing waveform to counteract against the acoustic noise, wherein the noise reduction means is integrated within the housing for actively reducing acoustic noise by broadcasting a noise reducing waveform that is generated from said noise, wherein the noise reducing means further comprises means for reading a servo signal from the storage medium using from the transducer, wherein the waveform generating means generates a noise reducing waveform based on said servo signal.

2. A data storage device as in claim 1, wherein the servo signal is correlated to vibrations of at least one of the storage medium and actuator.

3. A data storage device as in claim 2, wherein the storage medium includes data representing one or more cyclical noise waveforms that are representative of the acoustic noise generated by the actuator and motor drive.

4. A data storage device as in claim 3, wherein the noise reduction means further comprises means for detecting drive signals applied to said one of the actuator and motor drive, and the waveform generating means generates the noise reducing waveform based on the detected drive signals.

5. A data storage device as in claim 4, wherein the waveform generating means retrieves corresponding, stored cyclical noise waveforms based on the drive signals.

6. A data storage device as in claim 1, wherein the acoustic noise is generated by components within the housing.

7. A data storage device as in claim 1, wherein the acoustic noise is in part generated external of the housing.

8. A data storage device as in claim 1, wherein the noise reducing waveform is out of phase to the acoustic noise.

9. A data storage device as in claim 8, wherein the noise reducing waveform is substantially 180° out of phase to the acoustic noise.

10. A data storage device as in claim 1, wherein the waveform generating means comprises transducing means for detecting the acoustic noise, and the waveform generating means generates the noise reducing waveform based on the detected acoustic noise.

11. A data storage device as in claim 10, wherein the noise reduction means comprises means to filter cyclical acoustic noise.

12. A data storage device as in claim 1, wherein the waveform generating means comprises stored noise reducing waveforms.

13. A data storage device as in claim 12, wherein the noise reducing waveforms are stored in at least one of RAM, PROM, ROM and the storage medium.

14. A data storage device as in claim 1, wherein the waveform generating means comprises means for generating a noise reducing waveform based on characteristic acoustic noise of moving components in the housing.

15. A data storage device as in claim 14, wherein the waveform generating means generates the noise reducing waveform based on characteristic acoustic noise of at least one of the motor drive and actuator.

16. A data storage device as in claim 15, wherein the waveform generating means further comprises stored waveforms, and the waveform generating means selects the noise reducing waveform from the stored waveforms based on characteristic acoustic noise of at least one of the motor drive and actuator.

17. A data storage device as in claim 16, wherein the waveform generating means includes a waveform generator.

* * * * *